(12) United States Patent
Kalsi et al.

(10) Patent No.: US 12,475,084 B2
(45) Date of Patent: *Nov. 18, 2025

(54) FILE TRACKING ON CLIENT MACHINES SYNCHRONIZED WITH A CONTENT MANAGEMENT SYSTEM REPOSITORY

(71) Applicant: HYLAND UK OPERATIONS LIMITED, Maidenhead (GB)

(72) Inventors: Harpritt Kalsi, Slough (GB); Gregory Melahn, Raleigh-Durham, NC (US)

(73) Assignee: HYLAND UK OPERATIONS LIMITED, Maidenhead (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,848

(22) Filed: Apr. 11, 2024

(65) Prior Publication Data

US 2024/0256493 A1   Aug. 1, 2024

Related U.S. Application Data

(63) Continuation of application No. 17/721,075, filed on Apr. 14, 2022, now Pat. No. 11,977,522, which is a continuation of application No. 16/201,985, filed on Nov. 27, 2018, now Pat. No. 11,327,930, which is a continuation of application No. 14/300,916, filed on Jun. 10, 2014, now Pat. No. 10,140,309.

(51) Int. Cl.
| | |
|---|---|
| G06F 16/178 | (2019.01) |
| G06F 11/14 | (2006.01) |
| G06F 16/27 | (2019.01) |
| G06Q 10/10 | (2023.01) |
| H04L 67/1095 | (2022.01) |

(52) U.S. Cl.
CPC ........ *G06F 16/178* (2019.01); *G06F 11/1464* (2013.01); *G06F 16/275* (2019.01); *G06Q 10/10* (2013.01); *H04L 67/1095* (2013.01)

(58) Field of Classification Search
CPC .. G06F 16/178; G06F 16/275; G06F 11/1469; G06Q 10/10; H04L 67/1095
USPC .......................................................... 707/610
See application file for complete search history.

(56) References Cited

U.S. PATENT DOCUMENTS

| | | | | |
|---|---|---|---|---|
| 5,978,813 | A * | 11/1999 | Foltz | H04L 63/20 |
| 6,226,650 | B1 * | 5/2001 | Mahajan | G06F 16/275 |
| | | | | 379/93.12 |
| 6,625,623 | B1 * | 9/2003 | Midgley | G06F 11/1451 |
| | | | | 715/236 |
| 6,710,814 | B1 * | 3/2004 | Ueno | H04N 21/4305 |
| | | | | 348/E5.002 |
| 7,184,903 | B1 * | 2/2007 | Williams | H02J 13/00009 |
| | | | | 702/60 |

(Continued)

OTHER PUBLICATIONS

Non-Final Office Action dated Apr. 27, 2023 for U.S. Appl. No. 17/721,075.

(Continued)

*Primary Examiner* — Hanh B Thai
(74) *Attorney, Agent, or Firm* — Eschweiler & Potashnik, LLC

(57) ABSTRACT

Using a first unique identifier of a local file on a client machine associated with a second unique identifier of a content item maintained at a content management system repository, synchronization of the local file and the content item can be restored after a synchronization break.

20 Claims, 3 Drawing Sheets

(56) References Cited

U.S. PATENT DOCUMENTS

| | | | | |
|---|---|---|---|---|
| 8,181,064 B2* | 5/2012 | Owaki | | G06F 11/165 |
| | | | | 714/11 |
| 9,442,944 B2* | 9/2016 | Dwan | | G06F 16/215 |
| 9,473,526 B2* | 10/2016 | Brueckner | | G06F 9/45533 |
| 9,524,151 B2* | 12/2016 | Chan | | H04L 63/0853 |
| 9,703,801 B2* | 7/2017 | Melahn | | G06F 16/178 |
| 9,923,851 B1* | 3/2018 | Sprauve | | G06F 3/0482 |
| 9,934,303 B2* | 4/2018 | Newhouse | | G06F 16/235 |
| 10,019,501 B2* | 7/2018 | Zondervan | | G06F 16/275 |
| 2003/0065780 A1* | 4/2003 | Maurer, III | | G06F 11/1456 |
| | | | | 709/225 |
| 2004/0044799 A1* | 3/2004 | Sivaraman | | G06F 16/27 |
| | | | | 709/253 |
| 2004/0172423 A1* | 9/2004 | Kaasten | | G06F 16/1787 |
| 2004/0264089 A1* | 12/2004 | Furuya | | H02J 3/38 |
| | | | | 361/92 |
| 2006/0253501 A1* | 11/2006 | Langan | | G06F 16/178 |
| 2007/0038642 A1* | 2/2007 | Durgin | | G06F 16/27 |
| 2007/0088707 A1* | 4/2007 | Durgin | | G06F 16/275 |
| 2007/0219755 A1* | 9/2007 | Williams | | H02J 13/00009 |
| | | | | 702/182 |
| 2007/0288548 A1* | 12/2007 | Creamer | | H04L 67/1095 |
| | | | | 709/202 |
| 2009/0254590 A1 | 10/2009 | Shlomai et al. | | |
| 2009/0318078 A1* | 12/2009 | Girard | | G06F 9/4887 |
| | | | | 455/39 |
| 2010/0106685 A1* | 4/2010 | Ott | | G06F 16/1787 |
| | | | | 707/611 |
| 2010/0191942 A1* | 7/2010 | Owaki | | G06F 11/165 |
| | | | | 712/228 |
| 2011/0145363 A1 | 6/2011 | Ananthanarayanan et al. | | |
| 2011/0295802 A1* | 12/2011 | Parham | | G06F 16/27 |
| | | | | 707/625 |
| 2013/0091097 A1 | 4/2013 | Chung | | |
| 2013/0124618 A1* | 5/2013 | Zhong | | H04W 12/068 |
| | | | | 709/203 |
| 2013/0138607 A1 | 5/2013 | Bashyam et al. | | |
| 2013/0191339 A1 | 7/2013 | Haden et al. | | |
| 2013/0226876 A1* | 8/2013 | Gati | | G06F 16/184 |
| | | | | 707/652 |
| 2013/0226888 A1 | 8/2013 | Govind et al. | | |
| 2014/0025628 A1* | 1/2014 | Tse | | G06F 16/93 |
| | | | | 707/E17.01 |
| 2014/0059165 A1 | 2/2014 | Kim | | |
| 2014/0188790 A1* | 7/2014 | Hunter | | H04L 63/08 |
| | | | | 707/610 |
| 2014/0195516 A1* | 7/2014 | Balakrishnan | | G06F 16/168 |
| | | | | 707/722 |
| 2014/0229457 A1 | 8/2014 | Sydell et al. | | |
| 2014/0258350 A1* | 9/2014 | Duval | | G06F 16/176 |
| | | | | 707/829 |
| 2014/0289360 A1* | 9/2014 | Mahkovec | | H04L 67/1095 |
| | | | | 709/217 |
| 2014/0317128 A1 | 10/2014 | Simeonov et al. | | |
| 2014/0337491 A1* | 11/2014 | Barreto | | G06F 16/182 |
| | | | | 709/221 |
| 2014/0365432 A1 | 12/2014 | Jain et al. | | |
| 2015/0007167 A1 | 1/2015 | Mody et al. | | |
| 2015/0026222 A1 | 1/2015 | Litzenberger | | |
| 2015/0026257 A1 | 1/2015 | Balakrishnan et al. | | |
| 2015/0032690 A1* | 1/2015 | Hoque | | G06F 16/27 |
| | | | | 707/610 |
| 2015/0088817 A1* | 3/2015 | Dwan | | G06F 3/04842 |
| | | | | 707/610 |
| 2015/0149500 A1* | 5/2015 | Cowling | | G06F 11/2094 |
| | | | | 707/769 |
| 2015/0169207 A1 | 6/2015 | Mody et al. | | |
| 2015/0180894 A1* | 6/2015 | Sadovsky | | H04W 12/12 |
| | | | | 726/22 |
| 2015/0254320 A1* | 9/2015 | Cowling | | G06F 16/182 |
| | | | | 707/613 |
| 2015/0278330 A1 | 10/2015 | Hawa et al. | | |
| 2017/0034198 A1* | 2/2017 | Powers | | H04L 63/1441 |
| 2018/0181634 A1* | 6/2018 | Newhouse | | G06F 16/2308 |

OTHER PUBLICATIONS

Final Office Action dated Oct. 5, 2023 for U.S. Appl. No. 17/721,075.
Notice of Allowance dated Jan. 2, 2024 for U.S. Appl. No. 17/721,075.

* cited by examiner

FILE TRACKING ON CLIENT MACHINES SYNCHRONIZED WITH A CONTENT MANAGEMENT SYSTEM REPOSITORY

CROSS REFERENCE TO RELATED APPLICATION

This application claims the benefit of the earlier filing date and claims priority to U.S. patent application Ser. No. 17/721,075, filed Apr. 14, 2022, which is a continuation of U.S. patent application Ser. No. 16/201,985, filed Nov. 27, 2018, now U.S. Pat. No. 11,327,930, which is a continuation of U.S. patent application Ser. No. 14/300,916, filed Jun. 10, 2014, now U.S. Pat. No. 10,140,309, entitled "FILE TRACKING ON CLIENT MACHINES SYNCHRONIZED WITH A CONTENT MANAGEMENT SYSTEM REPOSITORY," the content of each of these prior applications is incorporated by reference herein in entirety.

TECHNICAL FIELD

The subject matter described herein relates generally to content management systems and, in some implementations, more specifically to synchronization of content items in a content management system repository with local copies of the content items stored on one or more client machines.

BACKGROUND

Enterprise content management (ECM) covers a broad range of applications, including document management (DM), Web content management (WCM), records management (RM), digital asset management (DAM), search of managed content, and the like. A content management system (CMS) suitable for managing the various content items that an enterprise produces or generates, retains or otherwise stores, manipulates or modifies, etc. can support the requirements of one or more of such applications, and optionally other requirements, to provide a coherent solution in which content and management processes are capable of accessing content across a variety of applications subject to access controls, permissions, and the like. An "enterprise" can generally refer to an organization, such as for example a business or company, a foundation, a university, or the like, and can have content requirements related to one or more business processes, content uses, etc.

A CMS manages the actual digital binary content in a content item, the metadata that describes a context of each content item, associations between a content item and other content or content items, a place and classification of a content item in a repository, indexes for finding and accessing content items, etc. The CMS can also manage processes and lifecycles of content items to ensure that this information is correct. The CMS can further manage one or more processes (e.g. business processes, workflows, or the like) for creating, capturing, storing, manipulating, editing, and distributing content items, as well as all parts of a content item lifecycle (e.g., how long a content item is retained, what actions are taken after the end of a retention period, etc.).

A CMS for use in enterprise content management can include one or more of document management tools, applications, and interfaces to support general office work, search, and discovery. Workflow management capabilities of a CMS can support numerous business processes, optionally including, but not limited to, case management, review, and approval. Collaboration applications and services of a CMS can support the collaborative development of information and knowledge in the creation and refinement of content and documents. Web content management services of a CMS, which can be scalable, can support the delivery and deployment of content from the enterprise to its customers. Records management capabilities of a CMS can capture and preserve records based upon government-approved or other standards. A standards-based platform can also provide access to applications that use these standards, such as publishing, image management, email management, etc.

Services and controls for managing content of a CMS can include features such as metadata management, version control, lifecycle management, workflow, search, associations to other content, tagging, commenting, etc. that allow users of the CMS to find desired content items among very large content collections that can span multiple parts of an enterprise. Accuracy and consistency of the information can also be ensured, even for very large content collections across an enterprise. Content and other information in a CMS can be presented, published, etc. through the Web or any other channel appropriate to allow users to access that information.

Content management system repositories can also include the ability to synchronize content items maintained in a CMS repository with copies of these content items retained at one or more client machines. An example of this approach can include a local client synchronization application that executes on the one or more client machines, which can include but are not limited to desktop or laptop computers, mobile devices (smart phones, tablets, personal data assistants, or other mobile computer devices), or other machines having at least intermittent access to the CMS repository over a network connection (e.g. a local area network, a wide area network, a cellular data connection, the Internet, or the like, or combinations thereof). The local client synchronization application can synchronize a content item stored in the CMS repository with a copy of the content item stored on a local storage device (e.g. a hard drive, flash memory, random access memory, optical media, other magnetic media, or the like) associated with the client machine. A local storage device associated with the client machine can be integrated within the client machine, connected to the client machine as a peripheral device, accessible to the client machine over a networked connection, etc.

As used herein, content items can refer to any of files, folders or other directory structures, business processes, data objects, or any combination of one or more of such items or other similar or equivalent items. Examples of content items that can be managed by a CMS can include documents, images, photos, Web pages, records, XML documents, other unstructured or semi-structured files, etc. Content items retained in a CMS can also include directory structures such as folders, file trees, file plans, or the like, which can provide organization for multiple content items in addition to storing or otherwise representing relationships between content items, etc. Additionally, the approaches described herein for synchronizing file events occurring to content items stored at a CMS repository with those occurring to local copies of the content item at one or more client machines can be used by local client synchronization applications designed to synchronize content and/or metadata as well as more specialized clients, such as for example, a case management application running at a client machine that subscribes to all content items in a file set or other grouping of content items related to a specific case that are stored in one or more CMS repositories and that works to maintain local copies of those content items in proper synchronization with the content items in one or more CMS repositories.

In some examples, the local client synchronization application can communicate with the CMS repository to cause locking (e.g. allowing read-only access but not write access, allowing no access, etc.) of a content item at the CMS repository when a local copy of the content item is being edited or viewed via the local client synchronization application on the client machine. In other examples, locking of the content item at the CMS repository does not occur on opening or viewing of the local copy at the client machine. In these or other alternatives, locking of the local copy of a content item at the client machine can occur when the content item at the CMS repository is being edited, viewed, etc. Regardless of the access controls in place for the local copy or the content item itself, when changes to either of the content item or the local copy are saved, those changes are generally transmitted between the client machine and the CMS repository to maintain synchronization between the copy and the content item. This transmitting of saved changes generally occurs via the local client synchronization application initiating communication with the CMS repository to inquire whether changes have occurred to any content items at the CMS repository for which the client machine currently maintains a copy.

SUMMARY

Aspects of the current subject matter relate to approaches for restoring synchronization between a local file at a client machine and a content item maintained at a CMS repository. The restoring can be facilitated using a database or other listing that associates a first unique identifier of the local file with a second unique identifier of the content item.

In one aspect, a method includes associating this first unique identifier of the local file on the client machine with the second unique identifier of the content item maintained at the CMS repository. A local client synchronization application executes at the client machine to track synchronization between the local file and the content item. The local client synchronization application detects a break in the synchronization between the local file and the content item and restoring the synchronization based on the association between the first unique identifier and the second unique identifier.

In optional variations, one or more of the following features can be included in any feasible combination. The detecting of the break in the synchronization can include determining that a file path of the local file at the client machine has undergone an alteration that is not unambiguously tracked by the local client synchronization application. The break can include the local file being moved outside of a folder monitored by the local client synchronization application and later returned to the folder. The break can alternatively or additionally include the local file being deleted on the client machine and then restored. The first unique identifier can include one or more of an index node number of the local file at the client machine, a field identification of the local file at the client machine, an intermediate identifier abstracted from an operating system-specific identifier, and an identifier embedded into the local file. The second unique identifier can include a node identifier and/or a node reference corresponding to an index node number of the content item at the content management system repository.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

As discussed in greater detail below, features of the current subject matter can provide advantages that improve tracking of local copies of content items maintained at a client machine relative to content items maintained at a repository of a content management system.

Figure 1:
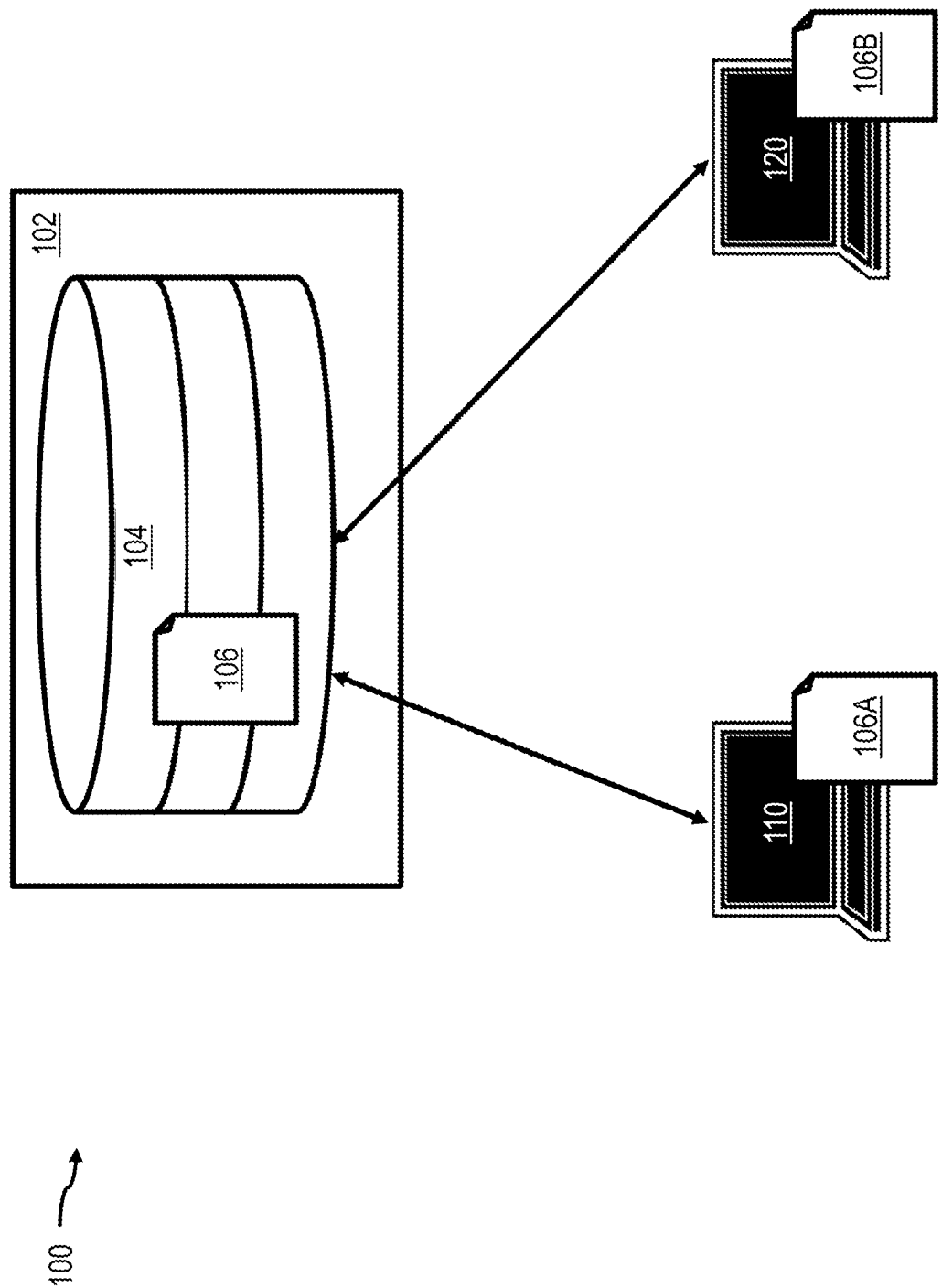
FIG. 1 is a diagram illustrating aspects of a system having one or more features consistent with implementations of the current subject matter.

FIG. 1 shows a diagram illustrating features of a computing arrangement 100 in which a content management system (CMS) installation 102 includes a CMS repository 104 on which a content item 106 is maintained. In this example, a first client machine 110 executing a local client synchronization application, which is properly authenticated against the CMS installation 102 to have the necessary access to the CMS repository 104, can store a first local copy 106A of the content item 106, and this first local copy 106A can be synchronized with the content item 106 stored at the CMS repository 104. The first local copy 106A can be stored at the first client machine 110 on any type of data storage medium, such as, for example, a hard disk drive, a flash drive, in main memory, on an internal or external drive or storage device, etc.

A second client machine 120 can optionally also store a second local copy 106B of the content item 106, and the second local copy 106B can be synchronized with the content item 106 stored at the CMS repository 104. Synchronization of content items between a client machine and the CMS repository 104 as used herein can generally refer to processes by which changes to either copy 106A and/or 106B are communicated over network connections between at least one client machine 110, 120 and the CMS repository 104.

In various examples of such a synchronization process, a local client synchronization application can be configured such that changes occurring to the content item 106 at the repository 104 are conveyed to the first and second client machines 110 and 120 for updating of the local copies 106A and 106B, and changes occurring to the first local copy 106A or second local copy 106B at either of the first client machine 110 or second client machine 120 are conveyed to the repository 104 for updating of the content item 106. In some implementations of the current subject matter, changes are transmitted as they are saved, either as a result of saving an edit to the first local copy 106A at the first client machine 110, saving an edit to the second local copy 106B at the second client machine 120, or saving an edit to the content item 106 at the CMS repository 104 (or by yet another client machine synchronizing changes to the content item 106 based on an edit to yet another local copy of the content item).

This conveying of changes can occur whenever a client machine 110, 120 running a local client synchronization application is connected to a network allowing communication with the CMS repository 104. For example, a local client synchronization application operating on the first client machine 110 can communicate with the CMS repository 104 or some other software component of the CMS installation 102 to inquire whether any changes have occurred to the content item 106 at the CMS repository 104 (e.g. so that such changes can be propagated to the first copy 106A) and to notify the CMS repository 104 of any changes that have occurred to the first copy 106A (e.g. so that such changes can be propagated to the content item 106). In cases in which the first client machine 110 is out of network communication with the CMS repository 104 for some period of time, when communication is restored, changes to either of the first local copy 106A or the content item 106 in the CMS repository 104 can be communicated between the first client machine 110 and the CMS repository 104. If both of the first local copy 106A and the content item 106 have changed, a conflict exception can be noted. Such a conflict exception can be resolved according to one or more conflict resolution parameters as discussed below. Changes synchronized from the first local copy 106A at the first client machine 110 to the content item 106 at the CMS repository 104 can be further synchronized to the second local copy 106B at the second client machine 120.

Figure 2:
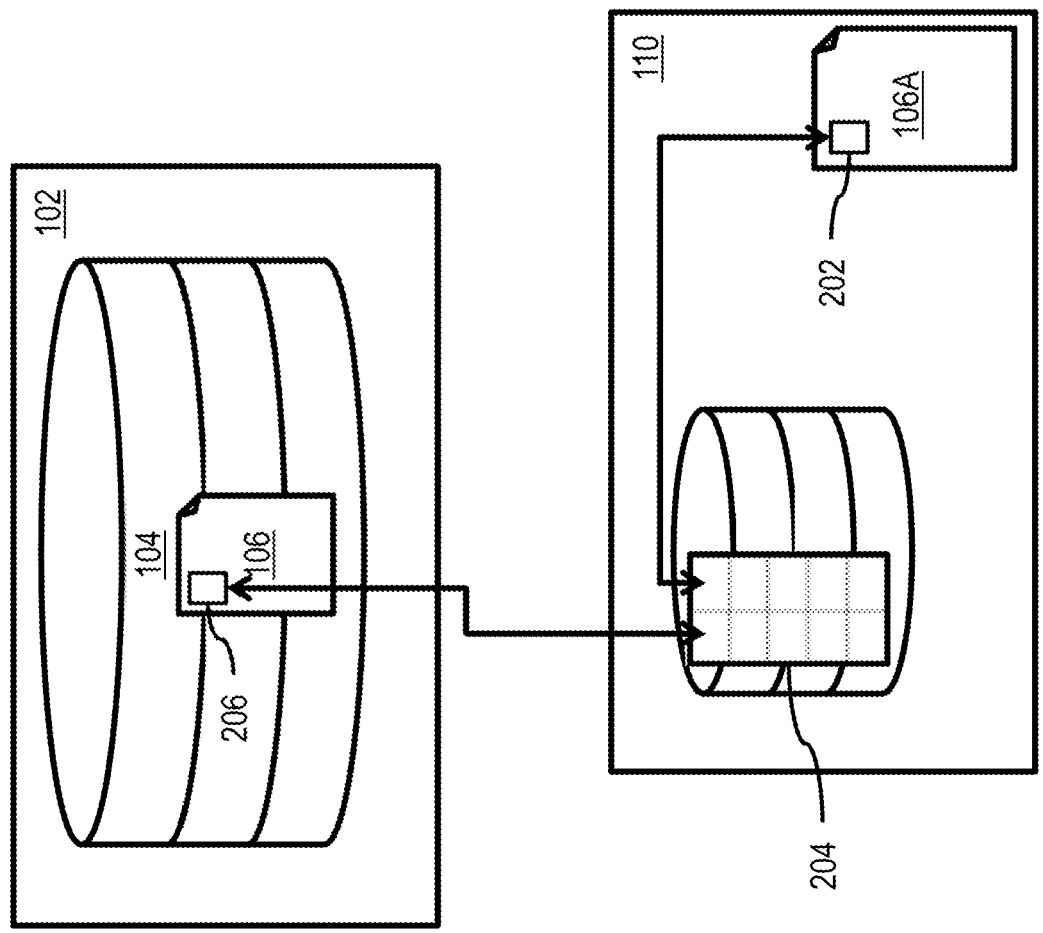
FIG. 2 is a diagram illustrating aspects of a content management system and a client machine having one or more features consistent with implementations of the current subject matter.

FIG. 2 shows a diagram illustrating file tracking on a client machine 110 that is synchronized with a CMS repository 104 of a CMS installation 102. In accordance with some implementations, a first unique identifier 202 of a local file 106A on a client machine 110 is associated with a second unique identifier 206 of a content item 106 maintained at the CMS repository 104. The first unique identifier 202 is stored in a local database 204. A local client synchronization application executing at the client machine 110 synchronizes and tracks the synchronization changes between the local file 106A and the content item 106 at the CMS repository 104 via the local database 204, by associating the first unique identifier 202 of the local file 106A with the second unique identifier 206 of the content item 106. In one example consistent with the current subject matter, the local database can include a table listing first unique identifiers 202 of one or more local files 106A at the client machine 110 and second unique identifiers 206 corresponding to the one or more content items 106 at the CMS repository 104 to which the one or more local files 106A are to be synchronized. As a simple implementation, the table can include a first column of first unique identifiers 202 and a second column of second unique identifiers 206 such that a row of the table is a record linking a first unique identifier 202 of a local file 106A with the second unique identifier 206 of the content item 106 at the CMS repository 104 with which the local file 106A is synchronized through operation of the local client synchronization application (e.g. by the local client synchronization application sending and receiving changes to content, metadata, etc. of the content item 106 and/or the local file 106A).

In some implementations, the second unique identifier 206 of the content item 106 can include a node identifier related to (e.g. uniquely designating) the content item 106 at the CMS repository 104. The first unique identifier 202 of the local file 106A can include an index node number (e.g., the index to an "iNode" in Linux). In some examples, an index node number can be paired with a file creation date/time stamp to provide a fully unique identifier. Other identifiers or combinations of data can also be suitably used. For example, in a Windows New Technology File System (NTFS), the first unique identifier 202 can include a combination of a volume serial number (i.e., a serial number assigned to a disk volume) and a FileId (i.e., file identification).

Certain content creation or modification applications have the potential to cause difficulties with simply recording a system-related first unique identifier 202 for a local file 106A. For example, applications such as Office™ (Available from Microsoft of Redmond, WA) can cause a "shuffling" of files during save operations as a measure to prevent or mitigate against data loss from an application or system crash. A simplified save operation under such an approach can include periodic saves of changes made to a document into a temporary file. When a user commands a document save, the temporary file can be moved to the original location of the document within the file structure on the client machine, thereby replacing the original document with the renamed temporary file. Use of a system-based value (e.g. an index to an "iNode" as in a Linux or Mac OSX system) as the first unique identifier 202 may lead to inaccuracies in the local database 204 under such conditions, because the renamed temporary file may not be assigned an identical system-based value. This issue can be further exacerbated when a synchronization is attempted after a period when the local client synchronization application has been inactive for some period of time while the file system of the client machine 110 has been modified underneath it. As such, in some implementations of the current subject matter, it may be beneficial to embed the first unique identifier 202 of a local file 106A within the local file itself, for example using a library or other application programming interface (API) capable of manipulating file formats of documents. An example of such an approach can include the use of Apache POI (available from the Apache Software Foundation of Los Angeles, CA) or the like to attach the first unique identifier 202 directly to the file without reliance on system-based values.

In some approaches consistent with the current subject matter, an intermediate value (e.g. an intermediate identifier) can be stored in the local database 204 as the first unique identifier 202 of a local file 106A instead of a system-based identifier such as those discussed above. The intermediate value can be abstracted from an operating system-specific system-based value such that the local database 204 can be formatted in an operating system-agnostic manner with only an API or other adapter interface required to translate between operating system-specific identifiers and the first unique identifier 202 stored in the local database.

The local client synchronization application executing at the client machine 110 can be configured to detect a break in the synchronization between the local file 106A and the content item 106. Upon restoration or resumption of the synchronization between the local file 106A and the content item 106, the local client synchronization application can restore the synchronization of the local file 106A based on associating the first unique identifier 202 of the local file 106A with the second unique identifier 206 of the content item 106 at the CMS repository 104.

Figure 3:
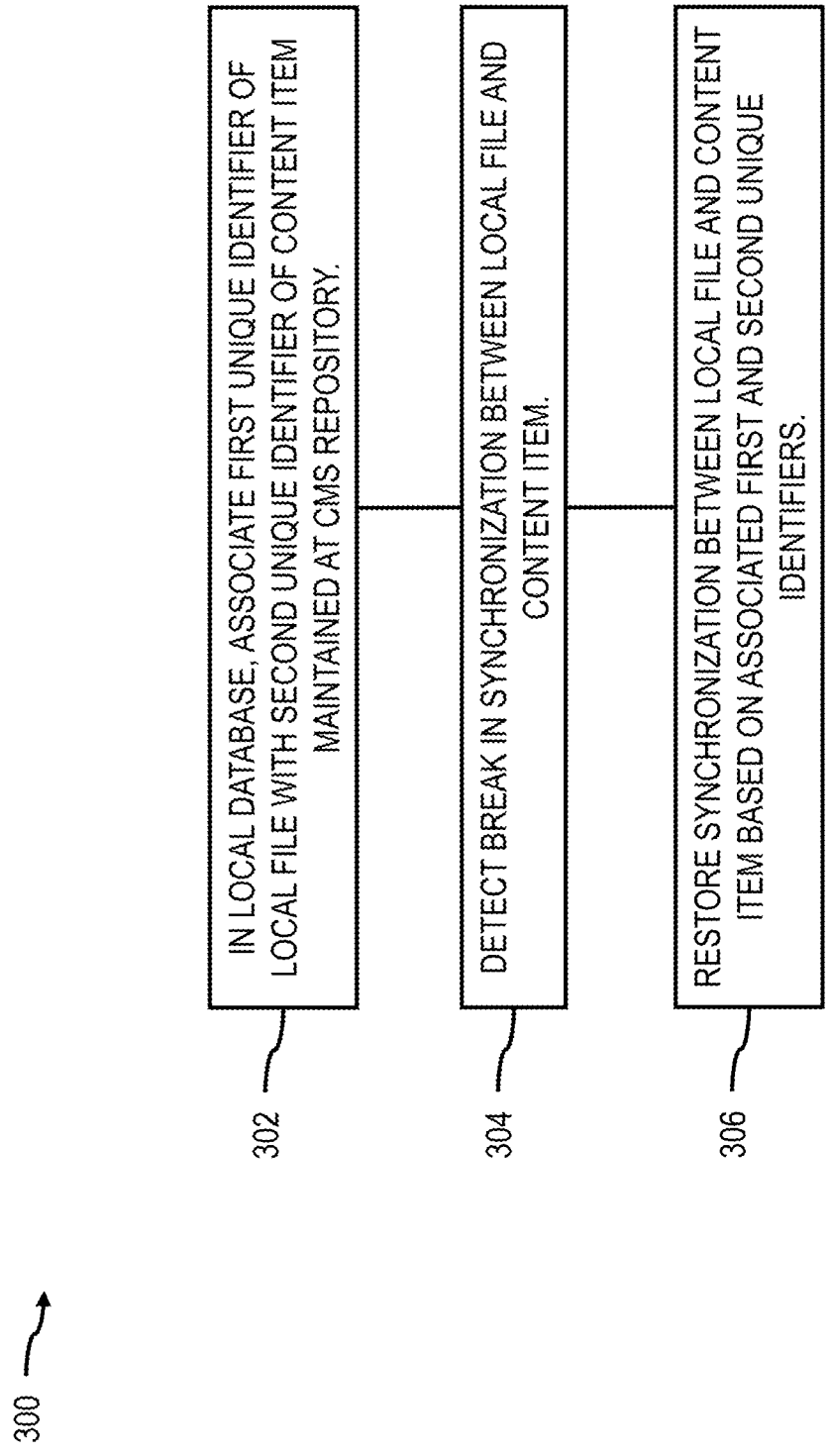
FIG. 3 is a process flow diagram illustrating aspects of a method showing features consistent with implementations of the current subject matter.

FIG. 3 is a process flow diagram of a method 300 for file tracking on a client machine that is synchronized with a CMS repository of a CMS installation. At 302, a first unique identifier of a local file on the client machine is associated with a second unique identifier of a content item that is maintained in a CMS repository. The content item is a copy of the local file (and vice versa), and therefore must be synchronized with any changes made to the local file. Instead of having to track a history of the changes to the local file, a state of the local file can be maintained by reference to its first unique identifier by a local client synchronization application executing on the client machine.

As discussed above, the local client synchronization application operates to track the synchronization between the local file and the content item. This tracking can include storing the first unique identifier associated with the local file and the second unique identifier associated with the content item at the CMS repository in a local database associated with the client machine. A local database associated with the client machine generally refers to a database or other listing of an association between first and second unique identifiers of a pair that includes a local file 106A and its corresponding, repository-maintained content item 106. The local database can be stored on a local storage device that is integrated within or otherwise accessible to the client machine (e.g. via a local bus, a local network, a wide area network, etc.). The second unique identifier is referenced by the local client synchronization application in its communications with the CMS repository to access the content item 106 in the CMS repository.

At 304, the local client synchronization application detects a break in the synchronization between the local file and the content item. The break can be either a temporary break or a permanent break. The detecting of the break can include the local client synchronization application determining that a file path of the local file at the client machine has undergone an alteration that the local client synchronization application cannot unambiguously track.

A temporary break can occur when either the client machine or the CMS repository is offline, such as if the client machine is a mobile device and becomes disconnected from a communication network connected with the CMS repository. Alternatively, a temporary break can occur when the local client synchronization application is not actively running (e.g. if a user action, a program execution fault, or the like causes the local client synchronization application to terminate at the client machine) and therefore is unable to monitor local file actions that should be synchronized with the corresponding content item at the CMS repository. When a temporary break occurs, the client machine cannot synchronize between the local file 106A and the content item 106. A temporary break can be remedied, for example by communication being restored between the local client synchronization application and the CMS repository. However, one or more changes to the local file may have occurred while the local client synchronization application was offline. Under previously available approaches, such changes may not be readily tracked for synchronization with the corresponding content item at the CMS repository.

A permanent break can occur when the local file is moved outside of a folder monitored by the local client synchronization application, in which case the client machine does not attempt to synchronize the content between the local file and the content item regardless of network connectivity. Moving of a local file outside of a folder monitored by the local client synchronization application can include a user simply moving the local file from one folder or location to another within the client machine file directory (e.g. by dragging and dropping using a user interface device such as a mouse, trackpad, touch screen, etc. or by executing a file move operation through other methods). Alternatively, the local file can be moved outside of a monitored folder by a file delete operation (e.g. to move the local file to the "trash," "recycle bin" or other user interface equivalent for a file directory location that holds files that have been discarded but are not yet permanently deleted from the file directory of the client machine).

A local file move resulting in a permanent break can be reversed, for example by the local file being moved back to the same folder, or alternatively another folder, monitored by the local client synchronization application. However, under previously available approaches, even if the local file is returned to a part of the client machine file directory monitored by the local client synchronization application, the original synchronization between the content item 106 and the local file 106A is not properly restored. Rather, under such existing approaches, the replacing of the local file 106A to a monitored location generally results in creation of a new version of the content item 106 while the original version of the content item 106 is deleted at the CMS repository 104. The replacing of the original content item 106 with the new version of the content item can result in a loss of history information, metadata, or other potentially useful tracking information about the content item.

In contrast, using an approach consistent with the current subject matter, synchronization between a local file and its corresponding content item at the CMS repository can be readily restored after either a temporary or permanent break. The local file in a local database associated with the client machine is provided a first unique identifier, either by the local client synchronization application or other application on the local client machine. The content item at the CMS repository to be synchronized with the local file is provided its own second unique identifier. The unique identifiers for the local file and each content item can be stored in a table on the local database, which is accessible by the local client synchronization application.

As discussed above, the first unique identifier 202 can include an index node number of the local file 106A. Alternatively, or additionally, the first unique identifier 202 can include a field identification of the local file 106A or an embedded identifier within the local file itself. In some implementations of the current subject matter, the first unique identifier 202 can include an intermediate identifier that is abstracted from a system-based identifier. The second unique identifier 206 can include a node identifier or node reference corresponding to the index node number of the content item 106 (at the CMS repository 104) corresponding to the local file stored at the client machine 110.

The local client synchronization application is configured to track synchronization between the local file and the content items maintained at the content management system repository. If the local client synchronization application detects a break in the synchronization between the local file and any of the content items, it will look up the first unique identifier and the associated second unique identifier to determine which files and content items are to be synchronized, and then restores the synchronization based on the association of the first unique identifier with the second unique identifier.

Accordingly, with reference again to FIG. 3, synchronization between the local file and the content item is restored at 306 based on the first unique identifier associated with the local file and the second unique identifier associated with the content item in the CMS repository. In other words, using the local database, the local client synchronization application is able to identify a local file and the content item to which that local file corresponds, even if synchronization between the local file and the content item is broken (e.g. for one of the reasons discussed above). The approaches described herein can be superior to existing techniques for tracking local files on a client machine 110 in that they do not rely on tracking of local files based on file path but instead determine or assign a first unique identifier for each local file 106A being tracked by a local client synchronization application such that changes to the file path at the client machine 110 that would otherwise result in breaking of synchronization between a local file 106A and its corresponding content item 106 at the CMS repository 104 are readily remedied by re-associating the local file 106A and the content item using the associated first and second unique identifiers 202, 206 in the local database 204. A local file 106A can be inspected and its identification relative to a corresponding content item 106 at the CMS repository 104 can be determined irrespective of its location or name (or changes thereto) occurring at the client machine 110. This information enables the local client synchronization application to accurately compare and determine what should take place in order to synchronize the local file 106A with the content item, without reliance on file path information. In some implementations of the current subject matter, the local client synchronization application can rely on the local database 204 associations of first unique identifiers 202 with second unique identifiers 206 for synchronization operations without reliance on file path information. In other implementations of the current subject matter, file path information is used as an initial resource for synchronization operations and the local database 204 is used if the file path information results in ambiguous or indeterminate association of a local file 106A with its corresponding content item 106.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented data synchronization system for use in an enterprise content management system comprising:
   a client machine associated with the enterprise content management system in communication with a storage medium including a database, the database storing a plurality of unique identifiers and associations between the plurality of the unique identifiers,
   a first unique identifier being associated with a local file stored on the client machine;
   a second unique identifier being associated with a content item maintained at an enterprise content management system repository remotely communicating with the client machine, and
   a client synchronization application that tracks synchronization between the local file and the content item based on associating the first unique identifier and the second unique identifier.

2. The system of claim 1, wherein the first unique identifier comprises an intermediate identifier abstracted from an operating system-specific identifier.

3. The system of claim 1, wherein a file path of the local file is examined to determine if the file path has undergone an alteration that is not unambiguously tracked by the local client synchronization application.

4. The system of claim 1, wherein a break in synchronization is detected and the break comprises at least one of: the local file being moved outside of a folder monitored by the local client synchronization application or the local file being deleted on the client machine.

5. The system of claim 1, wherein the first unique identifier comprises at least one of an index node number of the local file at the client machine, and a field identification of the local file at the client machine.

6. The system of claim 1, wherein the first unique identifier comprises an identifier embedded into the local file.

7. The system of claim 1, wherein the second unique identifier comprises a node identifier.

8. The system of claim 1, wherein the second unique identifier comprises at least one of a node reference corresponding to an index node number of the content item at the enterprise content management system repository.

9. A computer program product comprising a machine-readable medium storing instructions that, when executed by at least one programmable processor, cause the at least one programmable processor to perform operations comprising:
   associating a first unique identifier of a local file on a client machine with a second unique identifier of a content item maintained at a content management system, a local client synchronization application tracking a synchronization between the local file and the content item by storing the first unique identifier in a data structure local to the client machine in association with the second unique identifier, the first unique identifier being a non-system-based identifier; and
   re-associating, the local file and the content item, based on the association of the first unique identifier with the second unique identifier.

10. The computer program product of claim 9, wherein the re-associating takes place after an application or system crash.

11. The computer program product of claim 9, wherein the re-associating takes place without reliance on file path information of the local file.

12. The computer program product of claim 9, further comprising the local client synchronization application, retrieving the first unique identifier and the associated second unique identifier, the first unique identifier being embedded within the local file.

13. The computer program product of claim 9, wherein the re-associating is performed by the local client synchronization application executing at the client machine and the data structure is stored at the client machine locally.

14. The computer program product of claim 9, further comprising detecting a break in the synchronization comprises determining that a file path of the local file at the client machine has undergone an alteration that is not unambiguously tracked by the local client synchronization application.

15. The computer program product of claim 14, wherein the break comprises the local file being moved outside of a folder monitored by the local client synchronization application or the local file being deleted on the client machine.

16. The computer program product of claim 9, wherein the first unique identifier comprises at least one of an index node number of the local file at the client machine, a field identification of the local file at the client machine, an intermediate identifier abstracted from an operating system-specific identifier, and an identifier embedded into the local file; and
   the second unique identifier comprises at least one of a node identifier and a node reference corresponding to an index node number of the content item at a content management system repository.

17. A non-transitory computer readable medium for storing instructions that when executed by a computer processor cause the computer processor to perform operations comprising:

associating a first unique identifier of a local file on a client machine with a second unique identifier of a content item maintained at a content management system repository;

tracking a synchronization between the local file and the content item by storing the first unique identifier in a data structure local to the client machine in association with the second unique identifier;

the first unique identifier comprises at least one of an index node number of the local file at the client machine, a field identification of the local file at the client machine, an intermediate identifier abstracted from an operating system-specific identifier, or an identifier embedded into the local file; and after a system or application crash, re-associating the local file and the content item, based on the association of the first unique identifier with the second unique identifier; and displaying a synchronized file to a user.

18. The non-transitory computer readable medium of claim 17, further comprising detecting a break in a synchronization between the local file and the content item based on associating the first unique identifier and the second unique identifier.

19. The non-transitory computer readable medium of claim 17, wherein the second unique identifier comprises at least one of a node identifier and a node reference corresponding to an index node number of the content item at the content management system repository.

20. The non-transitory computer readable medium of claim 17, wherein the content management system is an enterprise content management system and the content item includes one or more of: a document file or an image file.

* * * * *